(12) United States Patent
Agrawal et al.

(10) Patent No.: US 6,240,744 B1
(45) Date of Patent: Jun. 5, 2001

(54) PROCESS FOR DISTILLATION OF MULTICOMPONENT FLUID AND PRODUCTION OF AN ARGON-ENRICHED STREAM FROM A CRYOGENIC AIR SEPARATION PROCESS

(75) Inventors: Rakesh Agrawal, Emmaus; Donn Michael Herron, Fogelsville; Jung Soo Choe, Gwynedd Valley, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/459,561

(22) Filed: Dec. 13, 1999

(51) Int. Cl.$^7$ .................................. F25J 3/00; F25J 5/00
(52) U.S. Cl. .................. 62/643; 62/905; 62/924
(58) Field of Search ................................ 62/643, 620, 901, 62/905, 924

(56) References Cited

U.S. PATENT DOCUMENTS

| | | | |
|---|---|---|---|
| 2,471,134 | 5/1949 | Wright | 196/100 |
| 3,100,697 | * 8/1963 | Hull | 62/620 |
| 5,339,648 | * 8/1994 | Lockett et al. | 62/905 |
| 5,755,933 | 5/1998 | Ognisty et al. | 202/158 |
| 5,946,942 | 9/1999 | Wong et al. | 62/643 |
| 6,023,945 | * 2/2000 | Wong et al. | 62/643 |

OTHER PUBLICATIONS

"Advanced Distillation Saves Energy & Capital", F. Lestak and C. Collins, Chemical Engineering, Jul. 1997, pp. 72–76.
"Multicomponent Distillation—Theory and Practice" by Petluyuk and Cerifimow (p. 198, figure VI–4e, published by Moscow Chemie, 1983).
"Partitioned Petlyuk Arrangement for Quaternary Separations", A.C. Christiansen, S. Skogestad and K. Lien, IChemE Symp. Series No. 142, pp. 745–756, 1997.

* cited by examiner

Primary Examiner—William Doerrler
(74) Attorney, Agent, or Firm—Willard Jone, II

(57) ABSTRACT

A process separates a multicomponent feed by distillation into at least one stream enriched in the most volatile component, one stream enriched in the least volatile component, and one stream enriched in a component of intermediate volatility. In one embodiment, the process produces an argon-enriched stream from a cryogenic air separation process. The distillation system includes at least one distillation column that produces a nitrogen-enriched stream from the top of the column, an oxygen product stream from the bottom of the column, and an argon-enriched stream from a partitioned section. The geometry of the partitioned section minimizes vapor and liquid distribution, and includes a vertical separating element and an end separating element to isolate the partitioned section from the intermediate distillation section. The equivalent diameter (De) of the partitioned section is at least 60% of the ideal diameter (Di) of the partitioned section, wherein the equivalent diameter is defined as four times the cross sectional flow area enclosed by the vertical separating element divided by the perimeter formed by the vertical separating element, and the ideal diameter (Di) is the diameter of a circle which has the same cross sectional flow area as that cross sectional flow area which is enclosed by the vertical separating element.

30 Claims, 8 Drawing Sheets

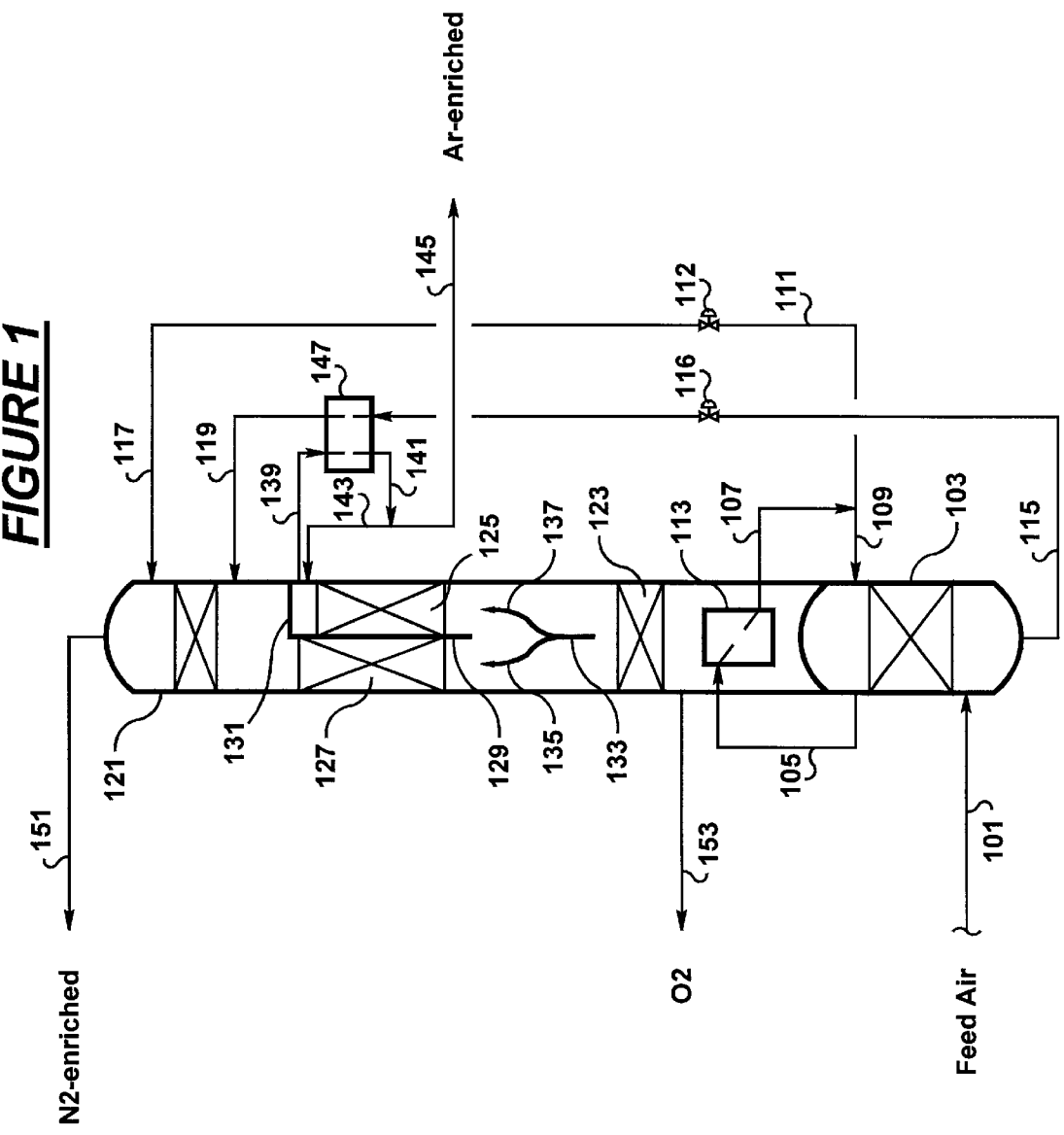

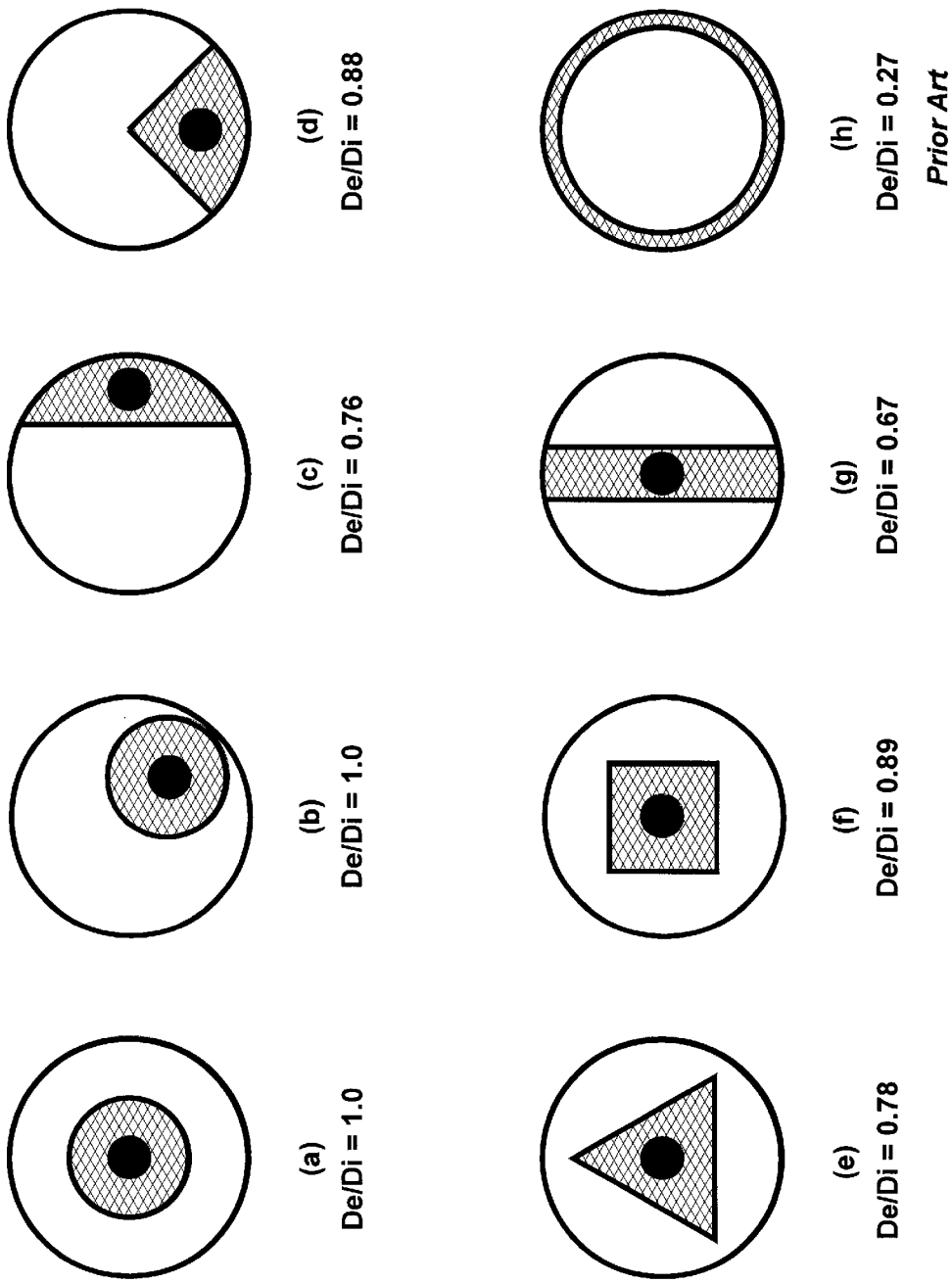

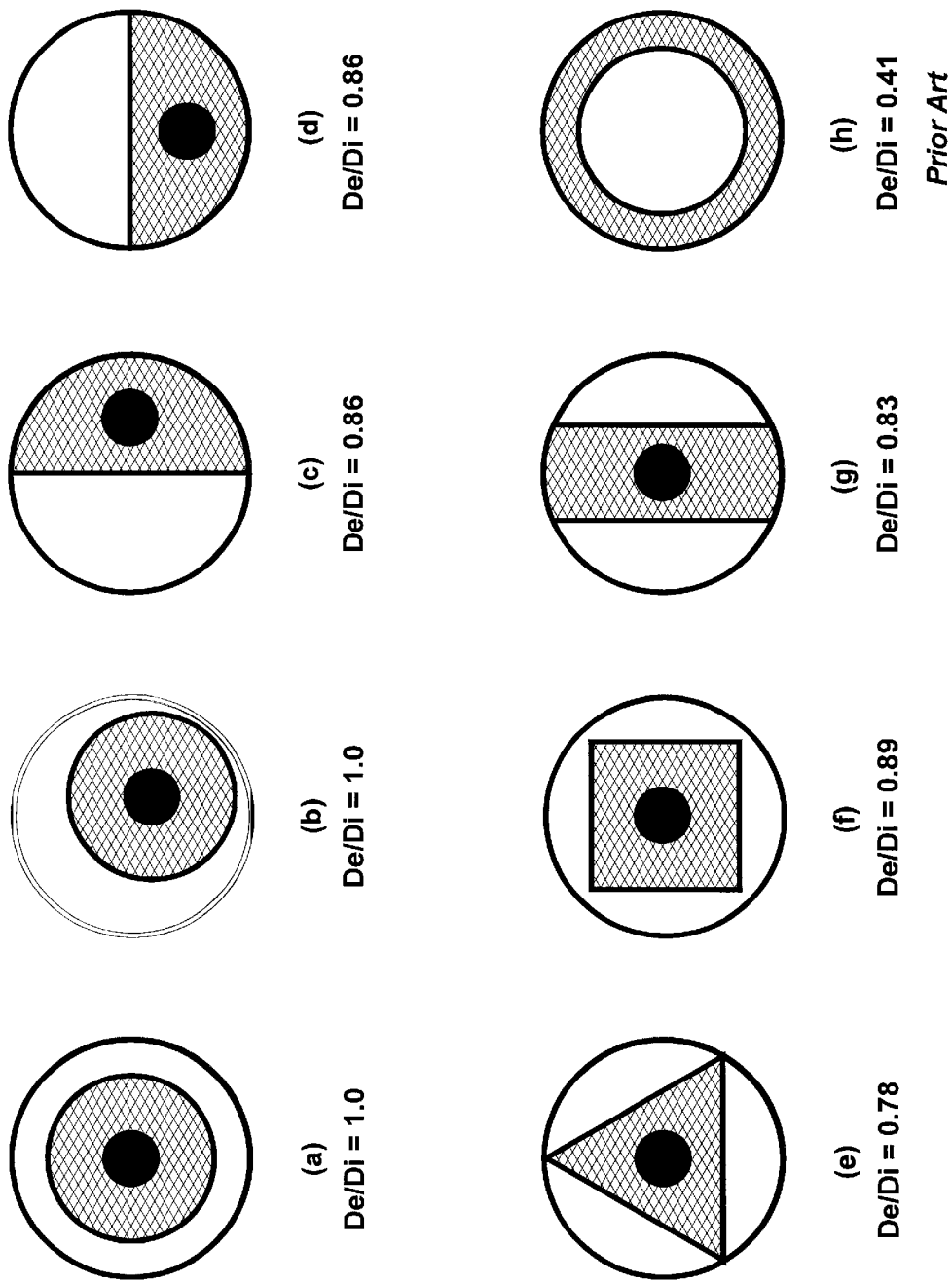

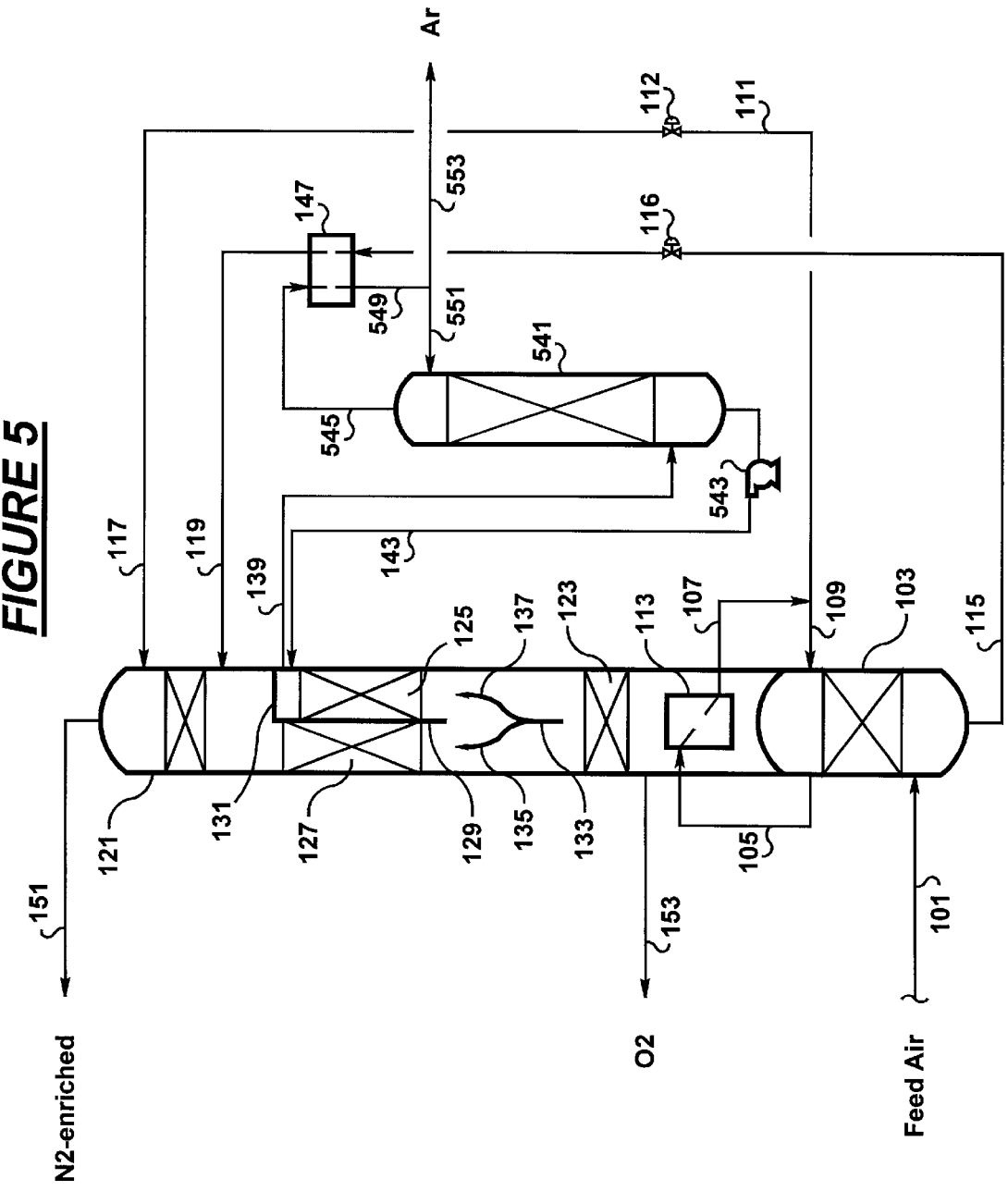

PROCESS FOR DISTILLATION OF MULTICOMPONENT FLUID AND PRODUCTION OF AN ARGON-ENRICHED STREAM FROM A CRYOGENIC AIR SEPARATION PROCESS

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention relates to the separation of a multicomponent feed by distillation into at least three streams: at least one enriched in a most volatile component, at least one enriched in a least volatile component, and at least one enriched in a component of an intermediate volatility. The separation is carried out using a distillation column having a partitioned section to recover a component of intermediate volatility. The present invention also relates to the production of an argon-enriched stream from a cryogenic air separation process using a partitioned section within a primary distillation column to rectify and enrich an argon-bearing stream.

The traditional method of recovering argon from air is to use a double-column distillation system having a higher pressure column and a lower pressure column thermally linked with a reboiler/condenser and a side-arm rectifier column attached to the lower pressure column. Oxygen product is withdrawn from the bottom of the lower pressure column and at least one nitrogen-enriched stream is withdrawn from the top of the lower pressure column. Vapor provided by the reboiler of the lower pressure column rises through the bottom section of that column then splits into two portions. A first portion continues up the lower pressure column into an intermediate distillation section above. A second portion is withdrawn from the lower pressure column and passed to the side-arm column. This portion, which generally contains between 5% and 15% argon, traces of nitrogen, and the balance oxygen, is rectified in the side-arm column to produce an argon-enriched stream substantially purified of oxygen. Typically, this argon-enriched stream, commonly referred to as crude argon, is withdrawn from the top of the side-arm column with an oxygen content ranging from parts per million (ppm) levels to 3 mole %. The rectification in the side-arm column is achieved by providing liquid reflux via a condenser located at the top of the side-arm column.

Since vapor is withdrawn from the lower pressure column to feed the side-arm column, the vapor flow to the intermediate section of the lower pressure column is necessarily reduced relative to the vapor flow in the bottom section of the lower pressure column. Commonly, steps must be taken to maintain proper mass transfer performance in the intermediate section, such as reducing the diameter of the column in the intermediate section to maintain appropriate vapor velocity and/or reducing the packing density to maintain appropriate liquid loading.

In general, whenever a side rectifier or a side-stripper is employed, vapor and liquid flow rates in the intermediate distillation section of the main column (e.g., a lower pressure column) are reduced relative to the flow rates in the distillation section below and/or the distillation section above.

Divided-wall columns have been proposed in the literature as a means to better utilize a given column diameter, and thereby reduce capital cost. Divided-wall columns essentially contain multiple distillation sections at the same elevation within a single column shell. An early example of the use of a divided-wall column is disclosed in U.S. Pat. No. 2,471,134 (Wright). Wright shows how a partitioning wall may be used to produce three products from a single distillation column. In Wright, the partition forms a separation zone, the top and bottom of which communicates with the main distillation column. Divided-wall columns of the type disclosed by Wright are discussed further by Lestak and Collins in "Advanced Distillation Saves Energy and Capital", Chemical Engineering, pages 72–76, July 1997. Christiansen, Skogestad, and Lien disclose further applications for divided-wall columns in "Partitioned Petlyuk Arrangements for Quaternary Separations", Distillation and Absorption '97, Institution of Chemical Engineers, Symposium Series No. 142, pages 745–756, 1997.

In "Multicomponent Distillation—Theory and Practice", by Petluyuk and Cerifimow (page 198, figure VI-4e, published by Moscow Chemie, 1983) the authors disclose a configuration for a divided-wall column where the partitioning wall is cylindrical and forms an annular separation zone, the top and bottom of which communicates with the main distillation column.

U.S. Pat. No. 5,946,942 (Wong, et al.) discloses an application of divided-wall principles to air separation. Wong discloses an apparatus wherein the lower pressure column contains an inner annular wall. The region contained between the inner annular wall and the outer shell of the lower pressure column constitutes a section for the production of argon product. A drawback of this divided-wall column for argon recovery stems from the geometry of the device used, as explained below.

The cross sectional geometry of the argon rectification section taught by Wong is annular. At the top of the annular section, the rising vapor must be collected and withdrawn. If a single outlet pipe is used, vapor from the farthest location in the annulus must travel significantly farther than vapor from the nearest location. This introduces flow maldistribution of vapor within the separation section below. Similarly, maldistribution of liquid also is a concern, especially if the separation section below uses packing. It is possible to mitigate maldistribution by taking steps, such as using multiple outlet and inlet pipes, but the result is a more complex and costly design. Furthermore, use of an annular geometry produces a relatively large wall surface area. Large wall surface area is discouraged when packing is used, because liquid tends to migrate to the walls, thereby introducing liquid flow maldistribution.

It is desired to have a process using the divided-wall concept which minimizes vapor and liquid maldistribution in the argon section of a distillation column.

It is further desired to have a process using the divided-wall concept which minimizes vapor and liquid maldistribution in any partitioned section used to recover a component enriched in an intermediate-volatility component.

It also is desired to have a process for separation of a multicomponent fluid which overcomes the difficulties and disadvantages of the prior art to provide better and more advantageous results.

BRIEF SUMMARY OF THE INVENTION

The present invention is a process for distillation of a multicomponent fluid containing at least three components, each component having a different volatility, into at least three streams. There are several embodiments of the invention and several variations of those embodiments.

A first embodiment of the invention is a process for distillation of a multicomponent fluid containing at least three components, each component having a different volatility into at least three streams. The process uses a distillation column system having at least a first distillation column which has disposed therein at least a first distillation section and a second distillation section. The process includes multiple steps. The first step is to provide an intermediate distillation section between the first distillation section and the second distillation section. The second step is to provide a partitioned section adjacent the intermediate distillation section. The partitioned section has a vertical separating element and an end separating element adjacent the vertical separating element. The vertical and end separating elements isolate the partitioned section from the intermediate distillation section, and the equivalent diameter (De) of the partitioned section is at least about 60% of the ideal diameter (Di) of the partitioned section. The third step is to feed the multicomponent fluid to the distillation column system, wherein a first portion of a fluid stream flows into the intermediate distillation section and a second portion of the fluid stream flows into the partitioned section. The fourth step is to withdraw a side stream from the partitioned second, said side stream being enriched in a component having an intermediate volatility between a highest volatility and a lowest volatility.

A second embodiment is similar to the first embodiment, but includes two additional steps. The first additional step is to withdraw a stream enriched in a component having the highest volatility from the location above at least one distillation section above the intermediate distillation section. The second additional step is to withdraw another stream enriched in a component having the lowest volatility from a location below at least one distillation section below the intermediate distillation section.

In addition, there are a number of variations of the first embodiment. For example, in one variation, the fluid stream is a vapor rising from a distillation section below the intermediate distillation section below. In a variant of this variation, the partitioned section has a top and a bottom, and a liquid is fed to the partitioned section at a location adjacent the top of the partitioned section. In a variant of that variant, the liquid is produced by at least partially condensing at least a portion of a vapor leaving the partitioned section.

In another variation of the first embodiment, the fluid stream is a liquid descending from a distillation section above the intermediate distillation section. In a variant of this variation, the partitioned section has a top and a bottom, and a vapor is fed to the partitioned section at a location adjacent the bottom of the partitioned section. In a variant of that variant, the vapor is produced by at least partially vaporizing a portion of the liquid leaving the partitioned section.

In another variation of the first embodiment, the vertical separating element is cylindrical. In yet another variation, the vertical separating element comprises a vertical wall attached to a cylindrical wall of the first distillation column.

In another variation of the first embodiment, the side stream is transferred to at least one other distillation column.

The present invention is applicable to the distillation of various multicomponent fluids containing at least three components. For example, the multicomponent fluid may be selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-nbutane-gasoline, and combinations of three or more components from C1 to C6 hydrocarbons or $C_4$ isomers.

As another example, the multicomponent fluid may be air and the at least three components are nitrogen having a highest volatility, oxygen having a lowest volatility, and argon having an intermediate volatility between the highest volatility and the lowest volatility.

A third embodiment of the present invention is a process for distillation of a stream of air into at least three streams. The process uses a distillation column system having at least a first distillation column which has disposed therein at least a first distillation section and a second distillation section. The process comprises multiple steps. The first step is to provide an intermediate distillation section between the first distillation section and the second distillation section. The second step is to provide a partitioned section adjacent the intermediate section. The partitioned section has a vertical separating element and an end separating element adjacent the vertical separating element. The vertical and end separating elements isolate the partitioned section from the intermediate distillation section, and the equivalent diameter (De) of the partitioned section is at least about 60% of the ideal diameter (Di) of the partitioned section. The third step is to feed the stream of air to the distillation column system, wherein a first portion of a fluid stream flows into the intermediate distillation section and a second portion of the fluid stream flows into the partitioned section. The fourth step is to withdraw an argon-enriched stream from the partitioned section.

There are a number of variations of the third embodiment. In one variation, the fluid stream is a vapor rising from a distillation section below the intermediate distillation section below. In a variant of this variation, the partitioned section has a top and a bottom, and a liquid is fed to the partitioned section at a location adjacent the top of the partitioned section. In a variant of that variant, the liquid is produced by at least partially condensing at least a portion of a vapor leaving the partitioned section.

In another variation of the third embodiment, the fluid stream is a liquid descending from a distillation section above the intermediate distillation section. In a variant of this variation, the partitioned section has a top and a bottom, and vapor is fed to the partitioned section at a location adjacent the bottom of the partitioned section. In a variant of that variant, the vapor is produced by at least partially vaporizing a portion of the liquid leaving the partitioned section.

In another variation of the third embodiment, the vertical separating element is cylindrical. In yet another variation, the vertical separating element comprises a vertical wall attached to a cylindrical wall of the first distillation column.

In another variation of the third embodiment, the argon-enriched stream has an oxygen content of less than bout 60 mole %.

In another variation, the argon-enriched stream is transferred to at least one other distillation column. In yet another variation, the argon-enriched stream is transferred to an adsorption separation system.

Another aspect of the present invention is an air separation unit using a process as in any of the embodiments or variations discussed above. For example, the present invention includes a cryogenic air separation unit using a process as in the first embodiment or the third embodiment.

The present invention also includes a distillation column system for distillation of a multicomponent fluid containing at least three components, each component having a different volatility, into at least three streams. The distillation column system comprises: a distillation column having a first distillation section and a second distillation section disposed therein; an intermediate distillation section disposed in the distillation column between the first distillation section and the second distillation section; and a partitioned section adjacent the intermediate distillation section disposed in the distillation column. The partitioned section has a vertical separating element and an end separating element adjacent the vertical separating element, wherein the vertical and end separating elements isolate the partitioned section from the intermediate distillation section, and the equivalent diameter (De) of the partitioned section is at least 60% of the ideal diameter (Di) of the partitioned section.

The present invention also includes several variations of the distillation column system. In one variation, the vertical separating element is cylindrical. In another variation, the vertical separating element comprises a vertical wall attached to a cylindrical wall of the distillation column.

BRIEF DESCRIPTION OF THE DRAWINGS

FIG. 1 is a schematic diagram of an embodiment of the present invention;

FIG. 3 illustrates various top views of different types of partitioned section geometries;

FIG. 4 illustrates various top views of additional types of partitioned section geometries;

FIG. 5 is a schematic diagram of another embodiment of the present invention;

DETAILED DESCRIPTION OF THE INVENTION

Figure 2B:
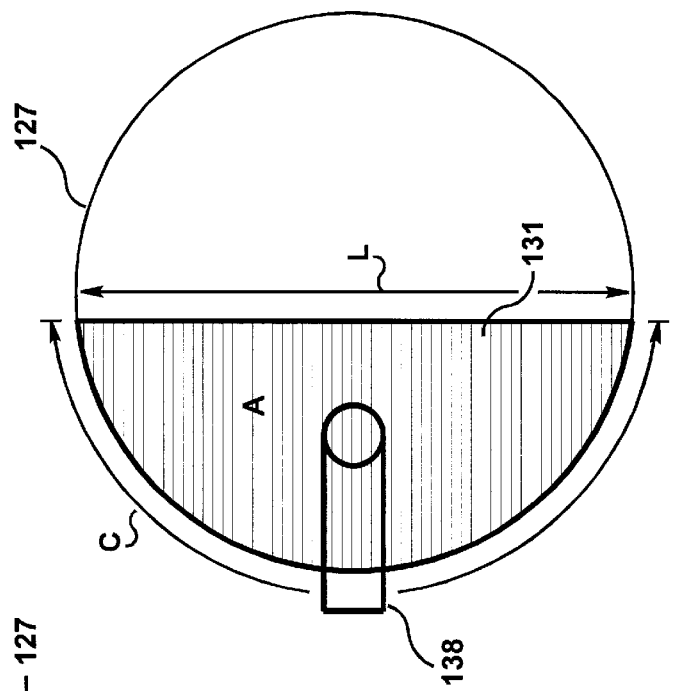
FIG. 2B is a schematic top view of a partitioned section in a column used in the present invention.

The present invention is a process for the separation of a multicomponent feed in a distillation system having at least one distillation column that produces at least one stream enriched in the most volatile component from the top of the column, at least one stream enriched in the least volatile component from the bottom of the column, and at least one stream enriched in a component of intermediate volatility from a partitioned section within the column. The process comprises the following steps:

a) a fluid stream from within the at least one distillation column is split into at least two portions;

b) a first portion from step a) flows into an intermediate distillation section of the at least one distillation column;

c) a second portion from step a) flows into a partitioned section of the at least one distillation column, said partitioned section comprising a vertical separating element and an end separating element to isolate said partitioned section from the intermediate distillation section at all locations except at the inlet of said partitioned section;

d) said second portion flows through the partitioned section and is removed from said partitioned section as a stream enriched in a component of intermediate volatility through an outlet in either the end separating element or an outlet in the vertical separating element;

e) the equivalent diameter of the partitioned section is at least 60% of the ideal diameter of the partitioned section, wherein the equivalent diameter is defined as four times the cross sectional flow area enclosed by the vertical separating element divided by the perimeter formed by the vertical separating element, and the ideal diameter is the diameter of a circle which has the same cross sectional flow area as that cross sectional flow area which is enclosed by the vertical separating element The present invention also is a process for the cryogenic separation of air in a distillation system comprising at least one distillation column that produces at least a nitrogen-enriched stream from the top of the column, an oxygen product stream from the bottom of the column, and an argon-enriched stream from a partitioned section within the column. The process comprises the following steps:

a) a fluid stream from within the at least one distillation column is split into at least two portions;

b) a first portion from step a) flows into an intermediate distillation section of the at least one distillation column;

c) a second portion from step a) flows into a partitioned section of the at least one distillation column, said partitioned section comprising a vertical separating element and an end separating element to isolate said partitioned section from the intermediate distillation section at all locations except at the inlet of said partitioned section;

d) said second portion flows through the partitioned section and is removed from said partitioned section as said argon-enriched stream through an outlet in either the end separating element or an outlet in the vertical separating element;

e) the equivalent diameter of the partitioned section is at least 60% of the ideal diameter of the partitioned section, wherein the equivalent diameter is defined as four times the cross sectional flow area enclosed by the vertical separating element divided by the perimeter formed by the vertical separating element, and the ideal diameter is the diameter of a circle which has the same cross sectional flow area as that cross sectional flow area which is enclosed by the vertical separating element.

Figure 2A:
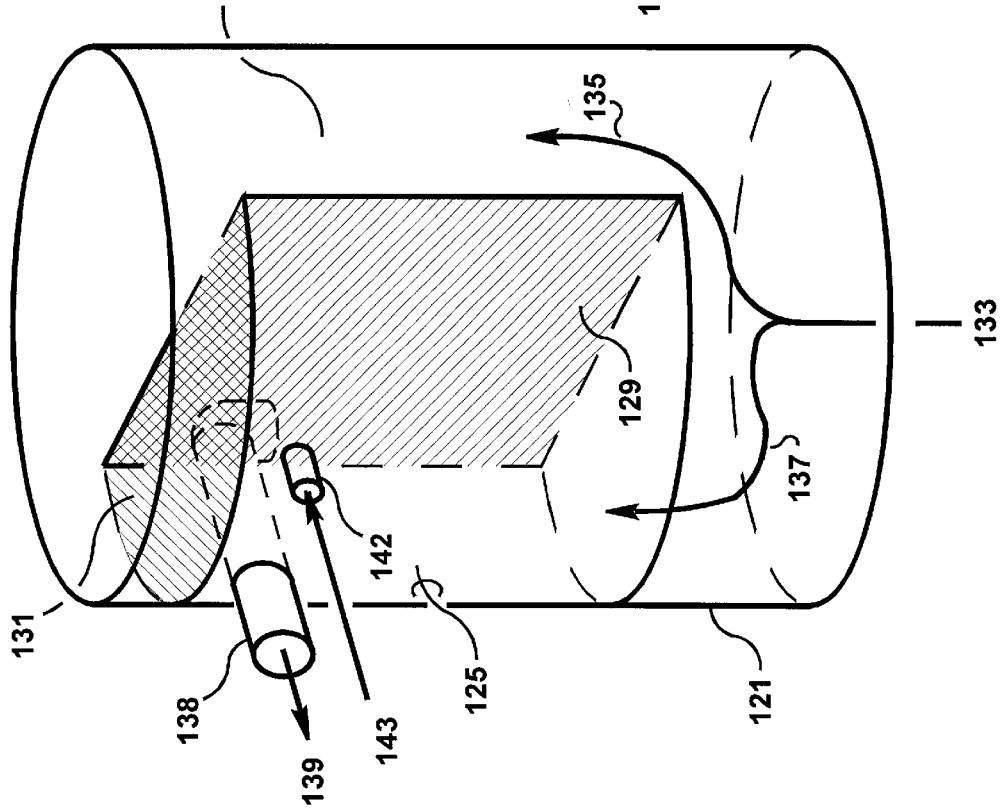
FIG. 2A is a schematic isometric view of a partitioned section in a distillation column used in the present invention.

To illustrate the concept of equivalent diameter and further describe the present invention, an example based on the separation of air is shown in FIG. 1 (which illustrates the process), and FIGS. 2A and 2B illustrate the geometry of the partitioned section. For the purpose of illustration, the multicomponent feed comprises nitrogen, the most volatile component, oxygen, the least volatile component, and argon, the component of intermediate volatility.

In FIG. 1, the compressed feed air stream, free of heavy components (such as water and carbon dioxide) and cooled to a suitable temperature, is introduced as stream 101 to the bottom of the higher pressure column 103. The pressure of this feed air stream generally is greater than 3.5 atmospheres and less than 24 atmospheres, with a preferred range of 5 to 10 atmospheres. The feed to the higher pressure column is distilled into a higher pressure nitrogen vapor stream 105 at the top of a column and a crude liquid oxygen stream 115 at the bottom of the column. Nitrogen vapor stream 105 is condensed in reboiler/condenser 113 to produce liquid stream 107, which subsequently is split into two streams, 109 and 111. Stream 109 is returned to the higher pressure column as reflux; stream 111 is eventually reduced in pressure by valve 112 and is directed to the top of the lower pressure column 121 as reflux stream 117. Although not shown (for simplicity), lower pressure column reflux stream 111 often is cooled via indirect heat exchange with another stream prior to introduction to lower pressure column 121. Crude liquid oxygen stream 115 is subjected to any number of optional indirect heat exchanges and, after being reduced in pressure by valve 116, eventually is introduced to the lower pressure column as stream 119.

The feeds to the lower pressure column 121 are distilled into a lower pressure nitrogen vapor stream 151 at the top of the column and an oxygen stream 153 at the bottom of the column. Vapor stream 133 exits bottom distillation section 123 of the lower pressure column and may contain between 3% to 25% argon but typically contains between 5% to 15% argon. Stream 133 is split into two fractions: a first portion 135 and a second portion 137.

The first portion 135 flows into an intermediate distillation section 127. The second portion 137 flows into a partitioned section 125, which comprises a vertical separating element 129 and an end separating element 131 to isolate the partitioned section 125 from the intermediate distillation section 127. Vapor stream 137 rises through the partitioned section 125 and is rectified to produce argon-enriched stream 139. Stream 139 is at least partially condensed in heat exchanger 147 to produce stream 141, which subsequently is split into two streams, 143 and 145. Stream 143 is returned to the partitioned section 125 as reflux; stream 145 is removed from the distillation system. The refrigeration for heat exchanger 147 is provided by partially vaporizing the crude liquid oxygen stream 115 after it has been reduced in pressure through valve 116.

Ideally, intermediate section 127 requires approximately 20 to 25 stages of separation. If the partitioned section 125 comprises a similar number of separation stages, then the oxygen content in the argon-enriched stream is nominally 10 mole % but may range between 3 mole % and 60 mole %. The purity of this argon-enriched stream is sufficient to be rejected from the distillation system without significantly increasing the loss of oxygen. In fact, operation in such an "argon-rejection" mode will increase the oxygen recovery of the distillation system, since inclusion of the partitioned column makes the oxygen-argon separation easier in bottom distillation section 123 of the lower pressure column.

FIGS. 2A and 2B show one possible configuration for the partitioned section. Referring to FIG. 2A, the vertical separating element 129 comprises a vertical plate and that portion of the column wall which is in contact with partitioned section 125. When viewed from the top (FIG. 2B), the vertical plate forms a line of length L and that portion of the column wall in contact with the partitioned section forms an arc of length C. The end separating element 131, when viewed from the top (FIG. 2B) has an area A. Argon-enriched vapor stream 139 and partitioned section reflux stream 143 (to the partitioned section) are shown as leaving/entering the column via vapor outlet pipe 138 and conduit 142. Alternatively, these streams may enter/leave through the end separating element 131.

The cross sectional flow area enclosed by the vertical separating element is shown as the shaded region in FIG. 2B and is denoted as A. The perimeter formed by the vertical separating element is the projected length L of the vertical plate plus the projected length C along the column wall. The equivalent diameter (De) is a term commonly used in fluid flow and is defined as four (4) times the cross sectional flow area divided by perimeter. For this example:

$$De = 4A/(L+C)$$

The equivalent diameter provides a measure of "roundness". Ideally, it would be desired for the top view (FIG. 2B) of the partitioned section to be circular. This geometry would tend to make the vapor flow path from the various positions in the partitioned section to the outlet nozzle (vapor outlet pipe 138) more uniform and thereby reduce vapor flow maldistribution. In addition, a circular geometry has the minimum perimeter and is most appropriate for minimizing the flow of liquid down the wall. If the top view (FIG. 2B) of the partitioned section is circular and the area of the projection is A, then the ideal diameter (Di) would be:

$$Di = (4A/\pi)^{1/2}$$

In accordance with the present invention, the ratio of the equivalent diameter to the ideal diameter (De/Di) must be greater than 0.6.

The cross-sectional area of the vapor outlet pipe 138 for argon-enriched stream 139 is typically 10% of the cross sectional area A. Note that, for clarity, the vapor outlet pipe shown in FIG. 2 is disproportionately small.

FIGS. 3 and 4 illustrate top views of different types of partitioned section geometries. FIGS. 3 and 4 are drawn to scale with the cross sectional area of the outlet pipe, shown as a solid black circle, equal to 10% of the cross sectional area of the partitioned section, shown as a cross-hatched region. FIG. 3 corresponds to a partitioned section having a cross sectional area that is 25% of the total column cross sectional area. FIG. 4 corresponds to a partitioned section having a cross sectional area that is 50% of the total column cross sectional area. Cross sectional areas required to practice the present invention typically lie within the range shown by FIGS. 3 and 4.

FIG. 3(a) shows a cylindrical partitioned section located in the center of the column cross section. FIG. 3(b) shows the same cylindrical partitioned section at a location offset from the center of the column. FIG. 3(c) shows a partitioned section which is bounded between a chord and the column wall. FIGS. 3(d), 3(e), and 3(f) show a pie, an equilateral triangle, and a square, respectively. FIG. 3(g) shows a partitioned section bounded by two chords. Finally, FIG. 3(h) shows the prior art configuration taught by U.S. Pat. No. 5,946,942 (Wong et al.).

The ratio of the equivalent diameter to the ideal diameter (De/Di) also is shown for each configuration. For the configurations represented by FIGS. 3(a) through FIG. 3(f), most regions of the cross-hatched area are within one pipe diameter of the nozzle (vapor outlet pipe). In FIG. 3(g), most regions of the cross-hatched area are within two pipe diameters of the nozzle (vapor outlet pipe). For the prior art configuration taught in FIG. 3(h), two features can be seen. First, it is not possible to project the nozzle onto the cross-sectional area. Second, the path lengths that must be traveled by vapor elements leaving the cross-hatched areas vary substantially.

As previously indicated, FIG. 3 reflects a relatively small partitioned section (i.e., 25% of the total column cross sectional area). FIG. 4 shows the same configurations for the case when the partitioned section occupies 50% of the total column cross sectional area. Here, FIGS. 4(a) through 4(g) illustrate that most regions of the cross-hatched area are within two pipe diameters of the nozzle (vapor outlet pipe). Again, the prior art configuration in FIG. 4(h) is subject to the same limitations that were discussed for FIG. 3(h).

Of the configurations shown in FIGS. 3(a) through 3(g) and FIGS. 4(a) through 4(g), some illustrate some portion of the partitioned section in contact with the outer wall of the main distillation column. This allows intermediate feeds to be introduced to and/or intermediate products to be withdrawn from the intermediate distillation section without penetrating or passing through the partitioned section.

In discussing the embodiment of FIG. 1 it was noted that the oxygen content of argon-enriched stream 139 can be fairly substantial and may not be suitable for delivery to the customer. The purity of the argon-enriched stream may be increased by extending the partitioned section upwards in the column beyond the location where intermediate section 127 ends. This adds stages of separation to the partitioned section and permits the production of a higher purity argon stream. It may be desirable in certain cases to extend the partitioned section all the way to the top of the distillation column 121, whereby the end separating element may be a portion of the head of column 121. It also may be desirable, in other cases, to employ the embodiment shown in FIG. 5.

As shown in FIG. 5, an additional distillation column 541 has been added to the process. This column receives argon-enriched vapor stream 139 as a feed and produces oxygen-depleted stream 545 from the top. Stream 545 is at least partially condensed in heat exchanger 147 to form stream 549, which subsequently is split into two portions, 551 and 553. Stream 553 is ultimately an argon product, but may contain nitrogen and oxygen and, therefore, may be subjected to further purification steps. Stream 551 is returned to column 541 as reflux, flows downward through the column, exits the bottom, is pumped in pump 543 if necessary, then is returned to partitioned section 125 as stream 143. Column 541 may provide a wide range of separation stages. Typically, 20 to 200 stages of separation will be used, depending on the desired oxygen content of stream 545.

Alternatively, one may elect to further purify argon-enriched stream 139 using a means other than distillation. For example, the argon-enriched stream may be removed from the process and passed to an adsorption separation system (not shown) for the removal of oxygen, nitrogen, or both. Such an adsorption separation may take place in a single bed or in multiple beds and may be carried out at cold, warm or even hot temperatures. Oxygen may be removed from the argon-enriched stream via a catalytic oxidation step as well. A membrane separation scheme also could be a suitable substitute for purification by distillation. Combinations of distillation and one of the three above mentioned alternatives may be used in conjunction to further purify argon-enriched stream 139.

Figure 6:
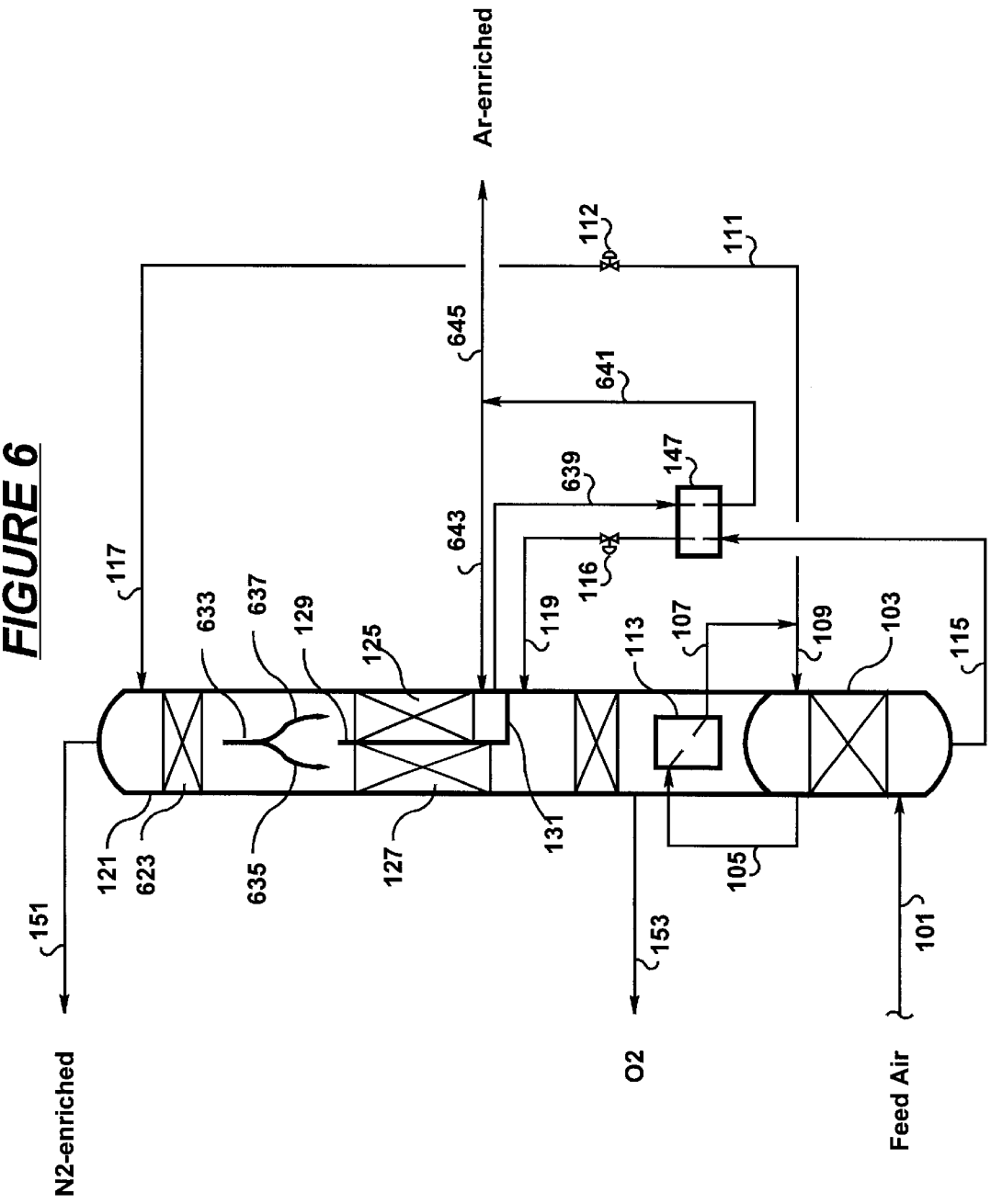
FIG. 6 is a schematic diagram of another embodiment of the present invention.

In the preceding discussions, the partitioned section 125 received vapor stream 137 as a bottom feed. As shown in FIG. 6, it also is possible to configure the partitioned section to receive a liquid as a top feed. In FIG. 6 the compressed feed air stream, free of heavy components (such as water and carbon dioxide) and cooled to a suitable temperature, is introduced as stream 101 to the bottom of the higher pressure column 103.

The pressure of this feed air stream is generally greater than 3.5 atmospheres and less than 24 atmospheres with a preferred range of 5 to 10 atmospheres. The feed to the higher pressure column is distilled into a higher pressure nitrogen vapor stream 105 at the top of the column and a crude liquid oxygen stream 115 at the bottom of the column. Nitrogen stream 105 is condensed in reboiler/condenser 113 to produce liquid stream 107, which subsequently is split into two streams, 109 and 111. Stream 109 is returned to the higher pressure column as reflux; stream 111 eventually is directed to the top of the lower pressure column 121 as reflux stream 118. Crude liquid oxygen stream 115 is subjected to any number of optional indirect heat exchanges and eventually is introduced to the lower pressure column as stream 119.

The feeds to the lower pressure column 121 are distilled into lower pressure nitrogen vapor stream 151 at the top of the column and oxygen stream 153 at the bottom of the column. Liquid stream 633 exits the top distillation section 623 of the lower pressure column and is split into two streams: a first portion 635 and a second portion 637. First portion 635 flows into the intermediate distillation section 127. Second portion 637 flows into a partitioned section 125, which comprises a vertical separating element 129 and an end separating element 131 to isolate the partitioned section from the intermediate distillation section 127. Liquid stream 637 descends through the partitioned section 125 and is distilled to produce argon-enriched stream 639. Stream 639 is at least partially vaporized in heat exchanger 147 to produce stream 641, which subsequently is split into two streams, 643 and 645. Stream 643 is returned to the partitioned section 125 as boilup; argon-enriched stream 645 is removed from the distillation system. The heat input for heat exchanger 147 is provided by cooling the crude liquid oxygen stream 115. In this mode of operation, stream 637 is substantially free of oxygen and the partitioned section performs a nitrogen-argon separation.

In FIGS. 1 and 5, refrigeration for heat exchanger 147 is derived from partially vaporizing the crude liquid oxygen stream 115. Persons skilled in the art will recognize that any liquid stream permitting a suitable temperature driving force in that heat exchanger 147 would be a suitable substitute for the crude liquid oxygen stream. Examples of such streams include a condensed air stream or a liquid nitrogen stream.

In FIGS. 1, 5 and 6, the oxygen product stream 153 is shown as being withdrawn from the lower pressure column 121 as a vapor. However, the present invention is not limited to such an operation. Persons skilled in the art will recognize that oxygen product stream 153 may be withdrawn from the lower pressure column as a liquid, pumped to a higher pressure, then vaporized and warmed. Gaseous oxygen produced in this manner also may be optionally compressed before being delivered to the end user. This technique is commonly referred to as pumped-LOX. To facilitate the vaporization of the pumped oxygen stream, it is common to compress a suitable gas, cool it, and then condense it by indirect heat exchange with the liquid oxygen. Examples of gases used for this purpose include feed air and nitrogen vapor recycled from the air separation unit. When air is used for this purpose, the condensed high pressure air is used as a feed to the higher pressure column 103, the lower pressure column 121, or both.

Condensed air also may be used in the present invention in a manner analogous to crude liquid oxygen. For example, condensed air may be cooled to provide the heat input for heat exchanger 147 in FIG. 6. Likewise, after being cooled and/or suitably reduced in pressure, condensed air may be used to provide refrigeration for heat exchanger 147 in FIGS. 1 and 5. As with condensed air, any liquid stream may alternatively be withdrawn from the higher pressure column and utilized for heat exchanger 147 in FIGS. 1, 5 and 6.

In FIG. 6, heat input to heat exchanger 147 is provided by cooling crude liquid oxygen. As stated above, other suitably warm fluids may be cooled. In addition, a fluid may be condensed in heat exchanger 147 of FIG. 6 to provide heat input. Examples of such fluids include a portion of vapor nitrogen from the higher pressure column or a portion of vapor air.

No reference is made in FIGS. 1, 5, and 6 to the nature of the mass exchange devices in any of the distillation sections. Persons skilled in the art will recognize that any of sieve trays, bubble-cap trays, valve trays, random packing, or structured packing, used individually or in combination, are suitable for the application of the present invention.

The embodiments of FIGS. 1, 5, and 6 illustrate the application of the present invention to in a double-column distillation system. It will be understood by persons skilled in the art that the double-column processes shown in these figures are simplified for clarity. Other feeds to the double column system often exist. For example: 1) a portion of the feed air stream may be expanded for refrigeration and fed to the lower pressure column 121; 2) multiple oxygen products may be withdrawn from the lower pressure column; and 3) an additional nitrogen-enriched stream may be withdrawn from a location above feed stream 119 in the lower pressure column 121 or from the higher pressure column 103.

Although double-column configurations are the most common for the recovery of oxygen and argon from air, the present invention is not limited to such configurations. For example, there exist single-column processes for oxygen recovery from air. Such processes may easily incorporate a partitioned section for producing an argon-enriched stream, and in such an event, the present invention would be applicable.

In FIGS. 1, 5 and 6, the heat exchanger 147 is shown to exist external to the lower pressure column 121. However, it is possible, and in some instances preferred, to locate the heat exchanger 147 inside the lower pressure column 121.

The present invention may be used to separate a multicomponent feed which comprises more than three components. Examples are shown in FIGS. 7 and 8 and are described below.

Figure 7:
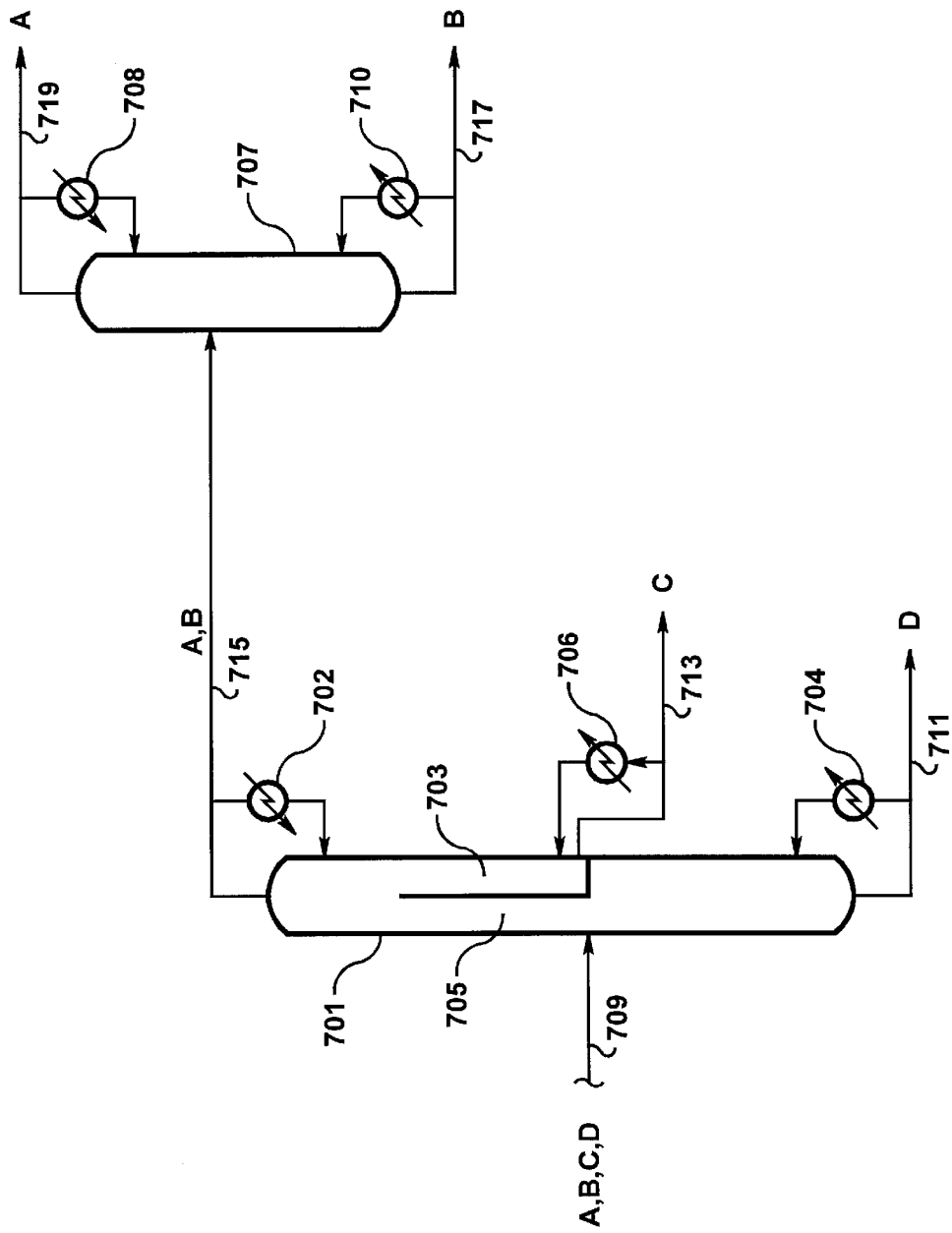
FIG. 7 is a schematic diagram of an embodiment of the present invention for separation of a four-component mixture.

FIG. 7 shows an example for the separation of a four-component mixture. Component A is the most volatile; component D is the least volatile; and components B and C are of intermediate volatility. The multicomponent feed 709 is introduced to distillation column 701 having a condenser 702, a reboiler 704, an intermediate distillation section 705, and a partitioned section 703. A stream enriched in the most volatile component A is withdrawn from the top of the column 701 as stream 715. In this example, stream 715 also contains one of the intermediate volatility components, B. Stream 711 enriched in the least volatile component D is withdrawn from the bottom of the column 701. Stream 713 enriched in intermediate volatility component C is produced from the partitioned section 703. A portion of this stream is vaporized in reboiler 706 and returned to the partitioned section as boilup. Stream 715 subsequently is fed to a downstream distillation column 707, which has a condenser 708 and a reboiler 710. Column 707 produces a fluid enriched in component A from the top of the column as stream 719 and a fluid enriched in component B from the bottom of the column as stream 717.

Figure 8:
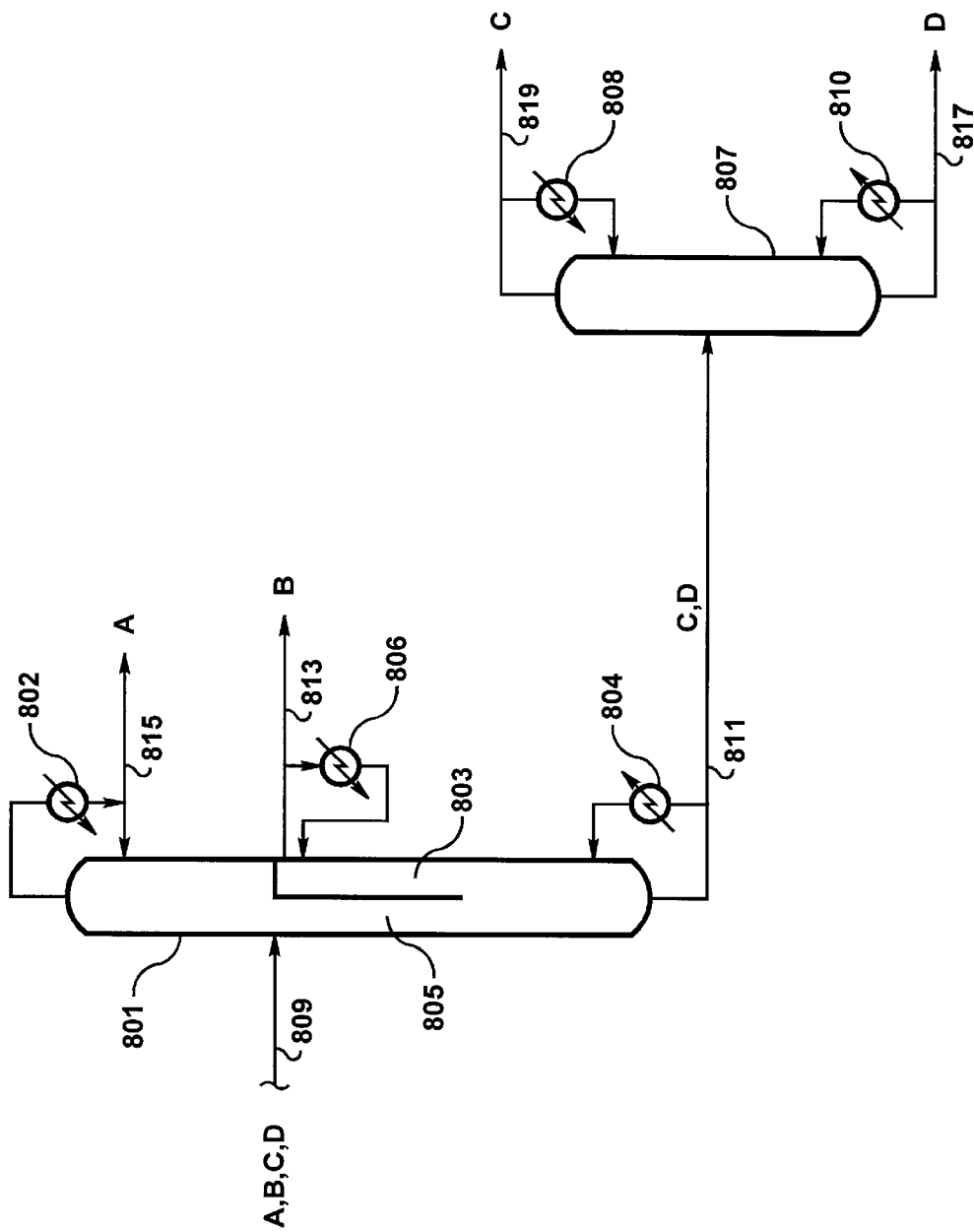
FIG. 8 is a schematic diagram of another embodiment of the present invention for the separation of a four-component mixture.

FIG. 8 shows another example for the separation of a four-component mixture. Component A is the most volatile; and component D is the least volatile; components B and C are of intermediate volatility. The multicomponent feed 809 is introduced to distillation column 801 having a condenser 802, a reboiler 804, an intermediate distillation section 805 and partitioned section 803. A stream enriched in the most volatile component A is withdrawn from the top of column 801 as stream 815. A stream enriched in the least volatile component D is withdrawn from the bottom of the column 801 as stream 811. In this example, stream 811 also contains one of the intermediate volatility components, C. Stream 813 enriched in intermediate volatility component B is produced from the partitioned section 803. A portion of this stream is condensed in condenser 806 and returned to the partitioned section 803 as reflux. Stream 811 subsequently is fed to a downstream distillation column 807, which has a condenser 808 and a reboiler 810. Column 807 produces a fluid enriched in component C from the top of the column as stream 819 and a fluid enriched in component D from the bottom of the column as stream 817.

It will be apparent to persons skilled in the art that the configurations shown in FIGS. 7 and 8 also can be applied to feed streams containing more than four components.

Although illustrated and described herein with reference to certain specific embodiments, the present invention is nevertheless not intended to be limited to the details shown. Rather, various modifications may be made to the details within the scope and range of equivalents of the claims and without departing from the spirit of the invention.

What is claimed is:

1. A process for distillation of a multicomponent fluid containing at least three components, each component having a different volatility, into at least three streams, said process using a distillation column system having at least a first distillation column having disposed therein at least a first distillation section and a second distillation section, comprising the steps of:

providing an intermediate distillation section between the first distillation section and the second distillation section;

providing a partitioned section adjacent the intermediate distillation section, said partitioned section having a vertical separating element and an end separating element adjacent the vertical separating element, wherein the vertical and end separating elements isolate the partitioned section from the intermediate distillation section and the equivalent diameter (De) of the partitioned section is at least about 60% of the ideal diameter (Di) of the partitioned section;

feeding the multicomponent fluid to the distillation column system, wherein a first portion of a fluid stream flows into the intermediate distillation section and a second portion of the fluid stream flows into the partitioned section; and withdrawing a side stream from the partitioned section, said side stream being enriched in a component having an intermediate volatility between a highest volatility and a lowest volatility.

2. A process as in claim 1, wherein the fluid stream is a vapor rising from a distillation section below the intermediate distillation section below.

3. A process as in claim 2, wherein the partitioned section has a top and a bottom, and a liquid is fed to the partitioned section at a location adjacent the top of the partitioned section.

4. A process as in claim 3, wherein the liquid is produced by at least partially condensing at least a portion of a vapor leaving the partitioned section.

5. A process as in claim 1, wherein the fluid stream is a liquid descending from a distillation section above the intermediate distillation section.

6. A process as in claim 5, wherein the partitioned section has a top and a bottom, and a vapor is fed to the partitioned section at a location adjacent the bottom of the partitioned section.

7. A process as in claim 6, wherein the vapor is produced by at least partially vaporizing a portion of the liquid leaving the partitioned section.

8. A process as in claim 1, wherein the vertical separating element is cylindrical.

9. A process as in claim 1, wherein the vertical separating element comprises a vertical wall attached to a cylindrical wall of the first distillation column.

10. A process as in claim 1, wherein the multicomponent fluid is air and the at least three components are nitrogen having a highest volatility, oxygen having a lowest volatility, and argon having an intermediate volatility between the highest volatility and the lowest volatility.

11. A process for distillation of a stream of air into at least three streams, said process using a distillation column system having at least a first distillation column having disposed therein at least a first distillation section and a second distillation section, comprising the steps of:
providing an intermediate distillation section between the first distillation section and the second distillation section;
providing a partitioned section adjacent the intermediate section, said partitioned section having a vertical separating element and an end separating element adjacent the vertical separating element, wherein the vertical and end separating elements isolate the partitioned section from the intermediate distillation section and the equivalent diameter (De) of the partitioned section is at least about 60% of the ideal diameter (Di) of the partitioned section;
feeding the stream of air to the distillation column system, wherein a first portion of a fluid stream flows into the intermediate distillation section and a second portion of the fluid stream flows into the partitioned section; and
withdrawing an argon-enriched stream from the partitioned section.

12. A process as in claim 11, wherein the fluid stream is a vapor rising from a distillation section below the intermediate distillation section below.

13. A process as in claim 12, wherein the partitioned section has a top and a bottom, and a liquid is fed to the partitioned section at a location adjacent the top of the partitioned section.

14. A process as in claim 13, wherein the liquid is produced by at least partially condensing at least a portion of a vapor leaving the partitioned section.

15. A process as in claim 11, wherein the fluid stream is a liquid descending from a distillation section above the intermediate distillation section.

16. A process as in claim 15, wherein the partitioned section has a top and a bottom, and a vapor is fed to the partitioned section at a location adjacent the bottom of the partitioned section.

17. A process as in claim 16, wherein the vapor is produced by at least partially vaporizing a portion of the liquid leaving the partitioned section.

18. A process as in claim 11, wherein the vertical separating element is cylindrical.

19. A process as in claim 11, wherein the vertical separating element comprises a vertical wall attached to a cylindrical wall of the first distillation column.

20. A process as in claim 11, wherein the argon-enriched stream has an oxygen content of less than about 60 mole %.

21. A process as in claim 11, wherein the argon-enriched stream is transferred to at least one other distillation column.

22. A cryogenic air separation unit using a process as in claim 1.

23. A cryogenic air separation unit using a process as in claim 11.

24. A process as in claim 1, wherein the side stream is transferred to at least one other distillation column.

25. A process as in claim 1, comprising the further steps of:
withdrawing a stream enriched in a component having the highest volatility from a location above at least one distillation section above the intermediate distillation section; and
withdrawing another stream enriched in a component having the lowest volatility from a location below at least one distillation section below the intermediate distillation section.

26. A process as in claim 1, wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

27. A distillation column system for distillation of a multicomponent fluid containing at least three components, each component having a different volatility, into at least three streams, comprising:
a distillation column having a first distillation section and a second distillation section disposed therein;
an intermediate distillation section disposed in the distillation column between the first distillation section and the second distillation section; and
a partitioned section adjacent the intermediate distillation section disposed in the distillation column, said partitioned section having a vertical separating element and an end separating element adjacent the vertical separating element, wherein the vertical and end separating elements isolate the partitioned section from the intermediate distillation section and the equivalent diameter (De) of the partitioned section is at least about 60% of the ideal diameter (Di) of the partitioned section.

28. A distillation column system as in claim 27, wherein the vertical separating element is cylindrical.

29. A distillation column system as in claim 27, wherein the vertical separating element comprises a vertical wall attached to a cylindrical wall of the distillation column.

30. A process as in claim 11, wherein the argon-enriched stream is transferred to an adsorption separation system.

* * * * *